United States Patent [19]
Ericson

[11] Patent Number: 5,563,458
[45] Date of Patent: Oct. 8, 1996

[54] APPARATUS AND METHOD FOR SENSING SURFACE FLEXURE

[76] Inventor: Paul L. Ericson, 3084 6th St., Boulder, Colo. 80304

[21] Appl. No.: 400,592

[22] Filed: Mar. 8, 1995

[51] Int. Cl.$^6$ .................................................. H01H 35/02
[52] U.S. Cl. .............................. 307/119; 307/112; 73/78; 73/104; 73/575; 73/760; 73/763; 356/371; 33/558; 250/442.11; 257/415
[58] Field of Search .............................. 307/119; 73/575, 73/760, 763, 104, 78; 250/442.11; 257/415; 356/371; 33/558

[56] References Cited

U.S. PATENT DOCUMENTS

| | | | |
|---|---|---|---|
| 3,908,279 | 9/1975 | Yoslow et al. | 33/174 |
| 4,359,892 | 11/1982 | Schnell et al. | 73/105 |
| 4,542,375 | 9/1985 | Alles et al. | 340/712 |
| 4,622,450 | 11/1986 | Kinoshita et al. | 219/69 |
| 5,373,730 | 12/1994 | Kovacevic | 73/81 |
| 5,459,577 | 10/1995 | Ototake et al. | 356/371 |

*Primary Examiner*—Jonathan Wysocki
*Assistant Examiner*—Albert W. Paladini
*Attorney, Agent, or Firm*—F. A. Sirr; E. C. Hancock; Holland & Hart

[57] ABSTRACT

Apparatus for sensing the flexure of a surface includes an array of bistable dome shaped switches within the surface which change their state or position depending on the direction and degree of local flexure of the surface. A flexible sheet parallel to the surface carries wiring for detecting the state of the bistable switches and carrying this information to a computer. A second parallel sheet may be used to detect the second position of the bistable switches for extra accuracy. The bistable switches may be linked, meaning the perimeters of the bistable switches overlap, or unlinked. The two stable positions may include two oppositely protruding positions, or one protruding position and one flat position.

17 Claims, 8 Drawing Sheets

APPARATUS AND METHOD FOR SENSING SURFACE FLEXURE

BACKGROUND OF THE INVENTION

1. Field of the Invention

This invention relates to apparatus and methods for sensing the surface flexure of a flexible sheet. This invention is particularly useful for providing flexure information to a computer.

2. Description of the Related Art

Recent developments in the fields of robotics and virtual reality have made it desirable for computers to obtain increasingly sophisticated information about the real world. For example, a robotic system might want information about an object which includes not only its weight and location, but also its orientation and shape. A virtual reality system may need to sense the motion of the user's hands, including bending of the fingers. It would be useful in certain contexts to accurately measure the surface motion of fluids.

Currently, sensing of shape and flexure is accomplished, if at all, either by remote sensors such as vision systems, or by expensive and delicate systems utilizing fiber optics, piezoresistant materials, or strain gages. A need remains in the art for a low-cost, mass-producible, and reliable way to measure shape and/or flexure.

SUMMARY OF THE INVENTION

An object of the present invention is to provide apparatus for sensing surface flexure. An array of bistable dome shaped switches change their state, or position, depending on the direction and degree of local flexure. By sensing the position (or state) of each of the array of bistable switches, two or three dimensional shape data may be provided to a computer in digital format.

Apparatus for sensing the surface flexure of a material comprises an array of bistable dome shaped switches, each of which assume one of two stable positions depending on the direction and degree of local surface flexure, or curvature, of the material. The bistable switches may be linked, meaning they have overlapping perimeters, or unlinked, meaning the switches have perimeters which do not overlap. The two stable positions may include a protruding position and a flat position, or may include two oppositely protruding positions.

Generally the surface flexure apparatus includes means for sensing when each of the bistable dome shaped switches is in one of the two stable positions. The sensing means may also sense when a switch is in the other of the two stable positions. The sensing means preferably includes a processor for keeping track of the state, or position, of each bistable dome shaped switch, means for applying voltage to each bistable dome shaped switch, wiring for carrying contact information from each switch to the processor, and means for making electrical contact between each bistable dome shaped switch and the wiring.

The apparatus may have the dome shaped switches organized into a plurality of one dimensional arrays (or lines of switches), with the voltage applying means applying voltage to all of the switches in a given array at the same time, such that each different array of switches has voltage applied at a different time. The wiring then detects which switches in a certain array are in a given position when that array has voltage applied to it. In this case, the material of the arrays may be electrically conductive, and the voltage applying means applies voltage to the entire array. Or, the voltage applying means may apply voltage to each bistable dome shaped switch individually. The voltage applying means may further include conductive pads attached to each switch.

Specialized circuitry such as a multiplexor may be provided for controlling the voltage applying means and for forwarding the switch position information from the wiring to the processor.

The material of the arrays may be metal, such as spring steel, or electrically conductive or non-conductive plastic, rubber, or the like.

BRIEF DESCRIPTION OF THE DRAWINGS

FIG. 2 is composed of FIGS. 2A and 2B.

FIG. 4 is composed of FIGS. 4A and 4B.

DESCRIPTION OF THE PREFERRED EMBODIMENTS

Figure 1:
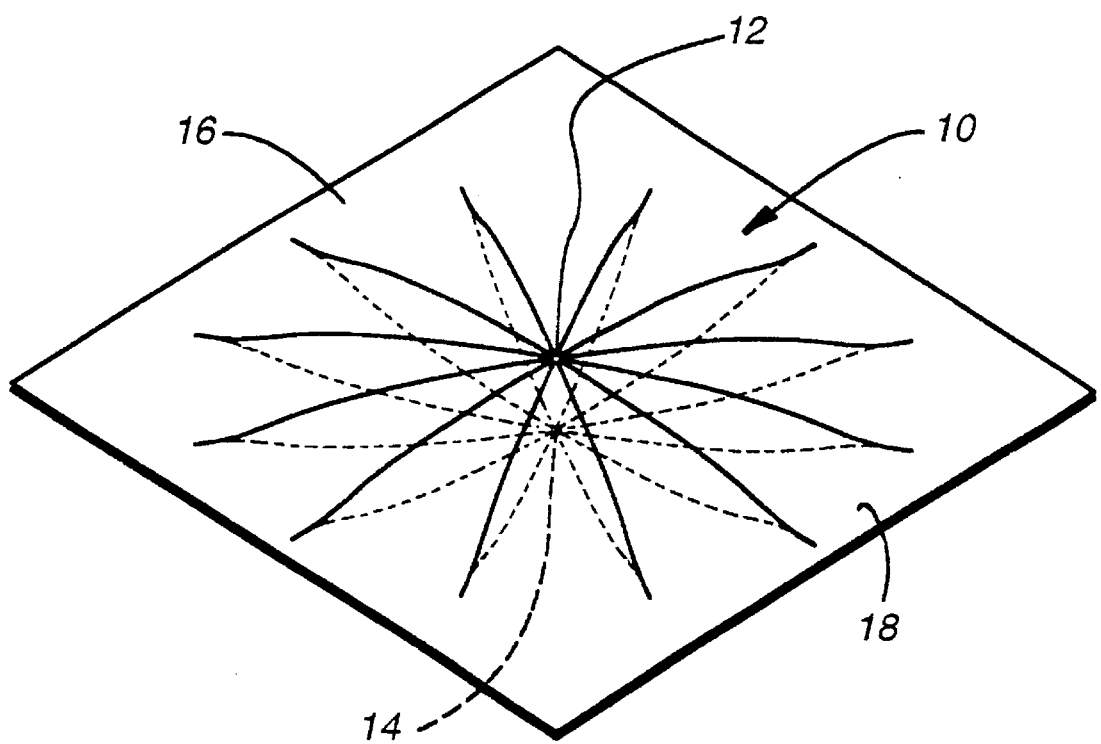
FIG. 1 shows a single bistable dome shaped switch of the type used in the preferred invention embodiments of FIG. 2A and FIG. 2B.

FIG. 1 shows a single bistable dome shaped switch 10 in accordance with the present invention. Bistable switch 10 has two stable physical positions; upward position 12, shown with solid lines and downward position 14, shown with dotted lines. Bistable switch 10 assumes one of the two stable positions 12, 14, depending on the flexure of the surrounding surface material such as 16, 18. If, for example, sides 16 and 18 are bent downward, bistable switch 10 pops into the upward position 12. If sides 16 and 18 are bent upward, bistable switch 10 pops into downward position 14. If sides 16 and 18 are not flexed either way, bistable switch 10 maintains its current position 12, 114, which position was randomly assumed. As used in this specification, a bistable switch has two stable positions, i.e. once the bistable switch assumes a position, it maintains that position until a physical change in its environment (bending or straightening of the surrounding material) causes it to change to the other stable position.

The amount of flexure necessary to cause bistable switch 10 to change positions depends on the material it is made of, as well as the structural proportions of switch 10 and its surrounding material. In the preferred embodiment, an array of bistable switches 10 are formed by stamping a thin hard steel sheet, such as a spring steel sheet, with a stamping device on both sides of the sheet at various locations on a one or two dimensional grid (each switch location is stamped on each side of the sheet). Other possible materials include other metals such as brass, and molded or stamped electrically conductive or non-conductive plastics such as polycarbonate. Other factors affecting the amount of flex required to cause bistable switch 10 to switch include: bistable switch height, diameter, material thickness, and the like. In the preferred spring steel embodiment, a 1:50 ratio of sheet thickness to switch diameter works well. Sheets may be as thin as 0.001" (one mil), and the bistable switches may be as small as 1/20" in diameter. Switch 10 height may be as little as one or two sheet thicknesses. In the preferred embodiment, bistable switches 10 are round, but oval switches are also possible, as are other shapes. Linked bistable switches have straight and common borders due to their overlapping circular perimeters, as shown in FIG. 2A.

Figure 2A:
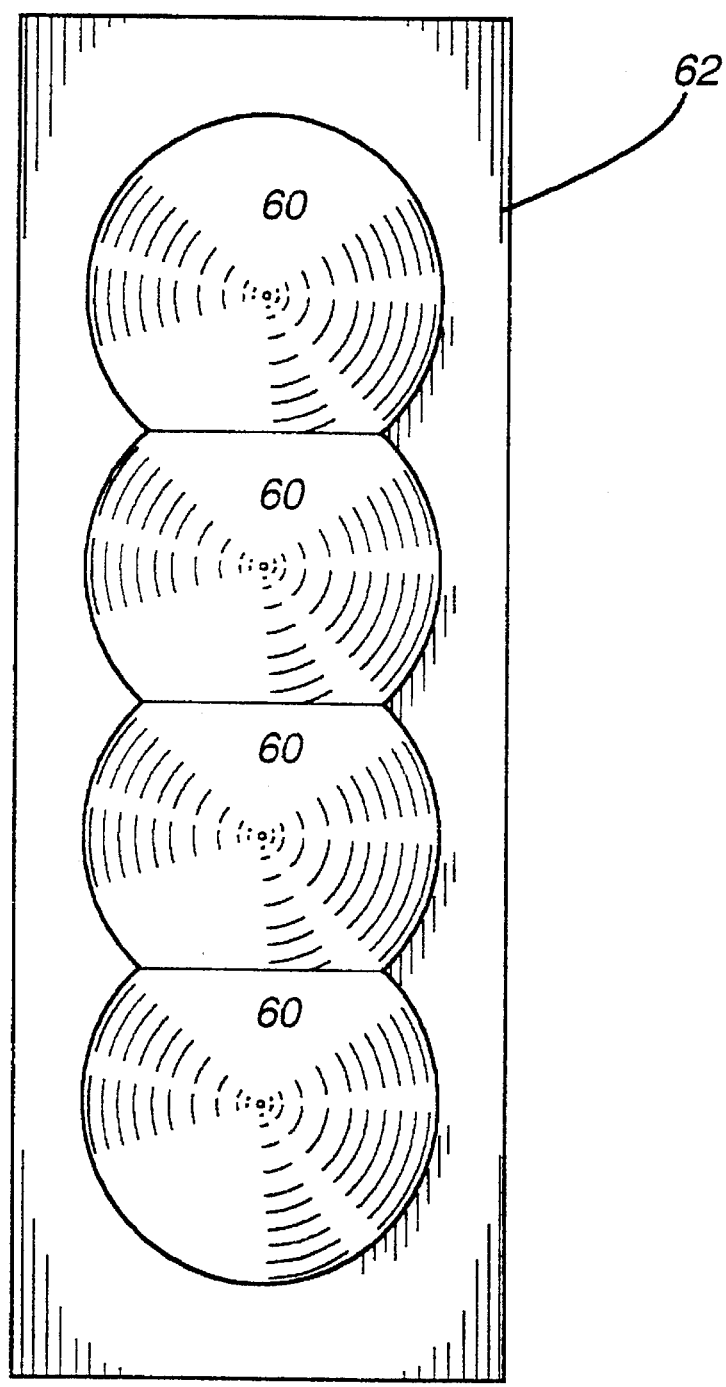
FIG. 2A shows a one dimensional array of four linked bistable switches in accordance with a first embodiment of the present invention.
Figure 2B:
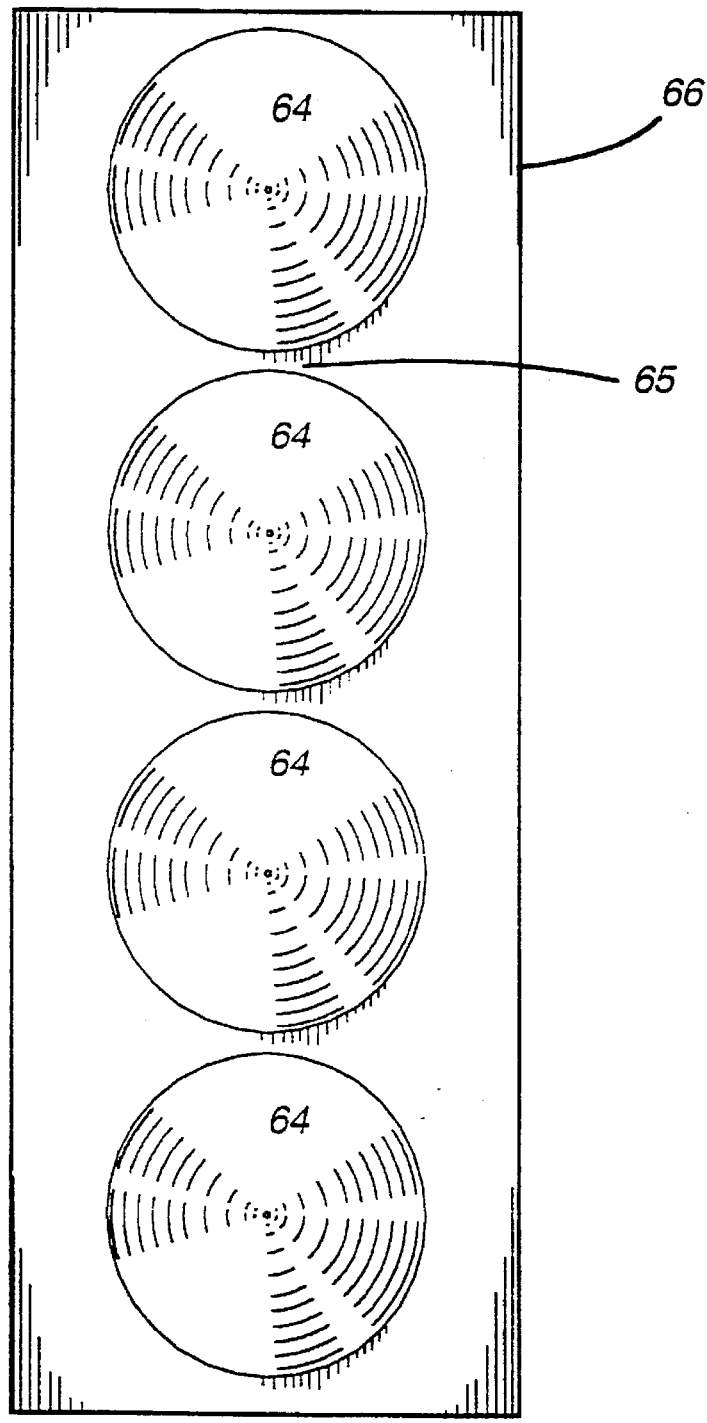
FIG. 2B shows a one dimensional array of four unlinked bistable switches in accordance with a second embodiment of the present invention.

FIG. 2 is composed of FIGS. 2A and 2B. FIG. 2A shows a top view of an array 62 of four individually controllable linked bistable switches 60. FIG. 2B shows a top view of an array 66 of four individually controllable unlinked bistable switches 64. Linked switches 60 of FIG. 2A have overlapping circular perimeters, leading to greater sensitivity and accuracy in measuring flex than unlinked switches 64 of FIG. 2B, whose perimeters do not overlap. This is because, in the unlinked bistable switches 64, the flat surface material 65 between the switches 64 must be flexed or bent to some degree before the switches 64 switch. Similarly, when the array 66 is unflexed (flexed back towards flat), the flat area 65 between bistable switches 64 unbends to some degree before the switches 64 switch back.

Unlinked bistable switches 64 of FIG. 2B may be made more sensitive by providing artificial linking in the form of ribbing or stiffeners connecting the switches, making them more sensitive to each other's state. For example, a band of stiffer material along the top and bottom of a line of unlinked bistable switches 64 creates somewhat of a "linking" effect. The top band might also operate as an electrically conductive line for use in switch circuitry.

In the linked bistable switches 60 of FIG. 2A, on the other hand, there is no flat area between the switches which must be flexed before switches 60 begin to sense the flex. Compression along the top of bistable switches 60 resulting from downward flex of array 62 is immediately distributed among all four of the switches 60. Thus, the proportion of bistable switches 60 in each stable position for a given curvature of array 62 is nearly identical whether the array 62 is being flexed or unflexed.

Figure 3A:
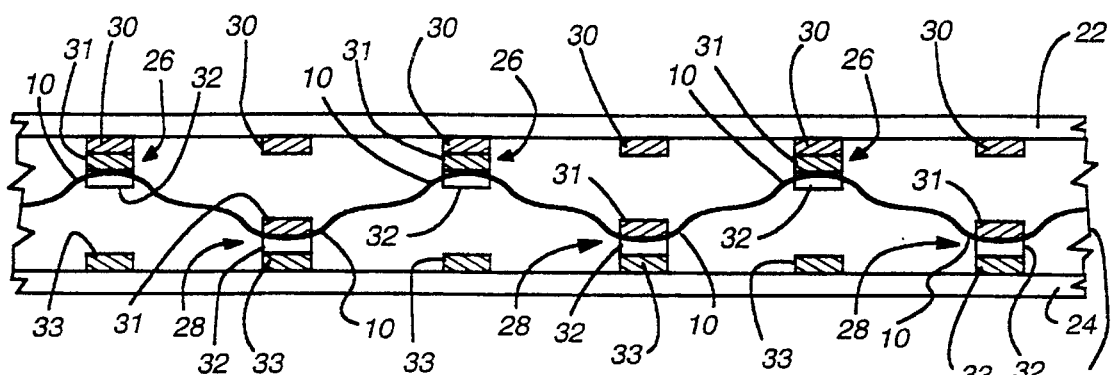
FIG. 3 is composed of FIGS. 3A, 3B, and 3C, and shows a side section view of a one dimensional array of six bistable switches of FIG. 1 in three different bending configurations.
Figure 3B:
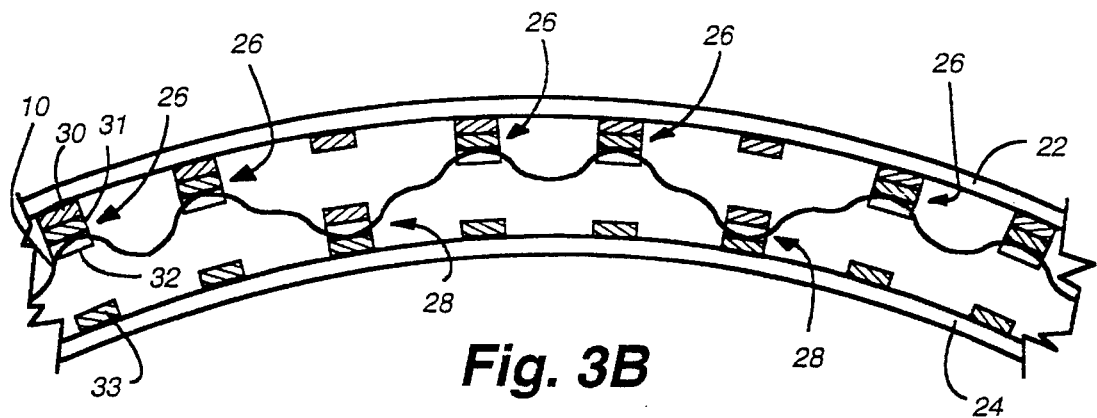
Figure 3C:
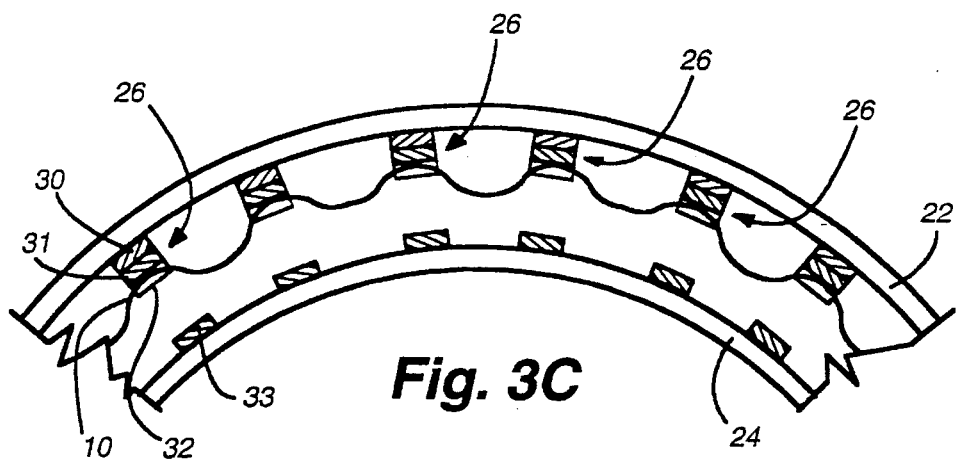

FIG. 3 is composed of FIGS. 3A, 3B, and 3C, and shows three side section views of a one dimensional array 20 of six bistable switches 10 of FIG. 1 in various bending configurations of array 20. Bistable switches 10 may be either the unlinked switches 64 of FIG. 2B or the linked switches 60 of FIG. 2A. As discussed above, linked bistable switches 60 reflect curvature more accurately than do unlinked switches 64.

Array 20 is sandwiched between two flexible electrically non-conductive sheets or cover layers 22 and 24, which carry wiring for detecting the position of the various bistable switches 10 within array 20. This wiring is better shown in FIG. 4. FIG. 3A shows array 20 in an unflexed configuration. In this example, approximately every other switch 10 is in the upward stable position 26 and the rest of the switches 10 are in the downward stable position 28. The upward position 26 of bistable switches 10 have upper conductive pads 31 contacting sheet 22 and its conductive pads 30. Switches 10 may also have lower conductive pads 32 for contacting lower sheet 24 pads 33, as is shown on downward positioned switches 10. The use of pads 32 and 33 is optional, because, if a bistable switch is not in the upward position 26, it may be assumed to be in the downward position 28. If greater accuracy is required, however, the lower position sensing pads 32, 33 may be desired.

Cover layers 22 and 24 could be made from any flexible non-conductive material, such as polyester or polyimide. Pads 30–33 could be made of rolled, annealed copper, electrodeposited copper, or polymer thick films, as could conductors 36 and 38 (shown in FIGS. 4A and 4B). Flexible circuitry for the pads and conductors is conventional and commercially available, for example from Litchfield Precision Components, Inc., and Sheldahl, Inc. Mass produced flexible circuitry adhered to flexible cover layers 22, 24 provides a convenient surface flexure sensing apparatus in accordance with the present invention. Spacers (not shown) can be used to separate array 20 from cover layers 22, 24.

FIG. 3B shows array 20 in a slightly bent configuration. More of bistable switches 10 are in the upward position 26 than in the downward position 28, but two switches 10 remain in the downward position 28. The bend of array 20 is smooth, so the ratio of upward positioned switches to downward positioned switches within a given length of array 20 remains constant. If the bend of array 20 were sharper in one area, more of the switches 10 in that area would be upward positioned at 26.

FIG. 3C shows a sharper bend in array 20. Now all of the bistable switches 10 are in upward position 26. Note that while the sheets 22 and 24 may be flexed further, no further flex can be detected because all of the bistable switches 10 have already switched. Cover layers 22 and 24 help protect the bistable switch array 20 from being flexed so far that array 20 may be damaged.

Figure 4A:
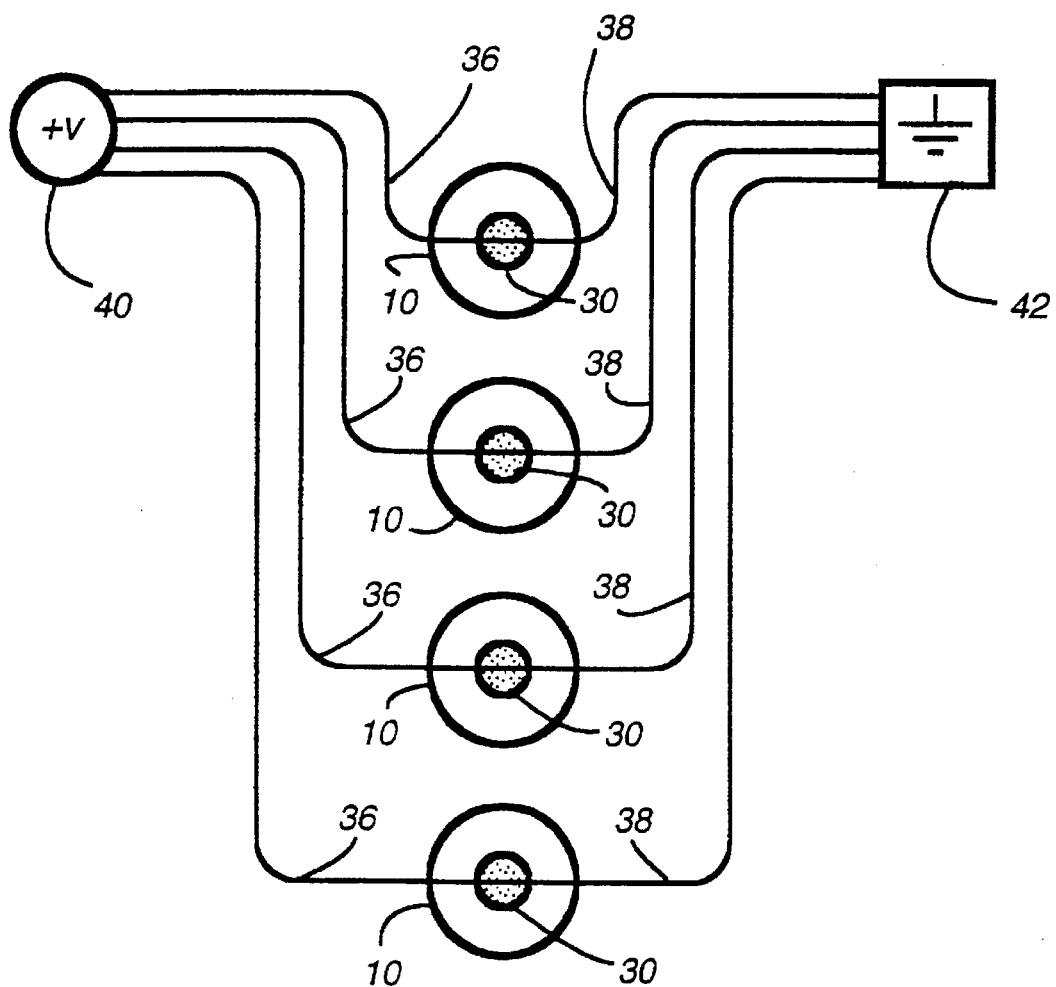
FIG. 4A shows a top section view of the one dimensional unlinked array of FIG. 2B and associated wiring.
Figure 4B:
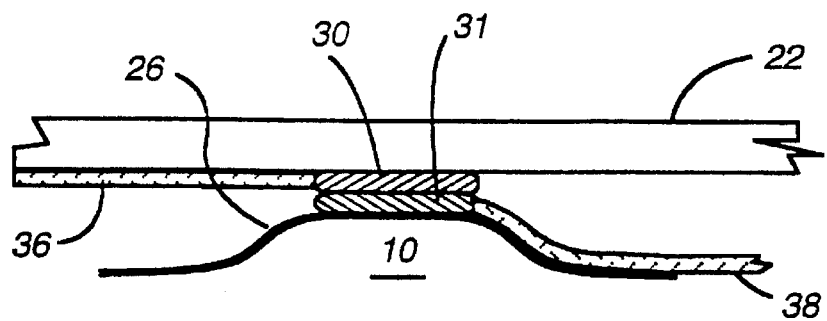
FIG. 4B shows an end section view of a single bistable switch of FIG. 4A and its associated wiring.

FIG. 4 is composed of FIGS. 4A and 4B and shows a portion of the one dimensional unlinked array 20 of FIG. 2A and the wiring 36, 38 that is associated with array 20 and sheets such as 22 and 24 of FIG. 3. FIG. 4A shows a top view of array 20, and FIG. 4B shows an end section view of a single bistable switch 10 of array 20. FIG. 4A shows the four wires 36 coming from positive voltage source 40 to the four stationary pads 30. As shown in FIG. 4B, wires 36 travel along sheet 22, to which pads 30 are physically attached. The four wires 38 lead from the four movable pads 31 on switches 10 to electrical ground 42. FIG. 4B shows switch pads 31, and wires 38 travelling along a surface of the material of which switch array 20 is made. Note that while the bistable switches 10 of FIG. 4A are drawn as unlinked switches, the circuitry would be exactly the same for linked switches.

FIG. 4B shows a single bistable switch 10 of FIG. 4A (either linked or unlinked) in the upward position 26. Thus, switch contact 33 physically engages sheet 22 contact 30, completing a circuit between conductors 36 and 38. If bistable switch 10 were in downward position 28, pads 30 and 31 would not contact, and an open circuit 36, 38 would be detected. Thus, the position of each bistable switch 10 can be monitored by noting the various short and open circuits 36, 38. If desired, similar pads 32, 33 and associated wiring could be added to lower sheet 24 as suggested in FIG. 3. Then, the position of each switch 10 would be monitored by determining which circuit, upper sheet 22 or lower sheet 24, was completed by a bistable switch 10. If neither circuit was completed, an error condition results.

Figure 5:
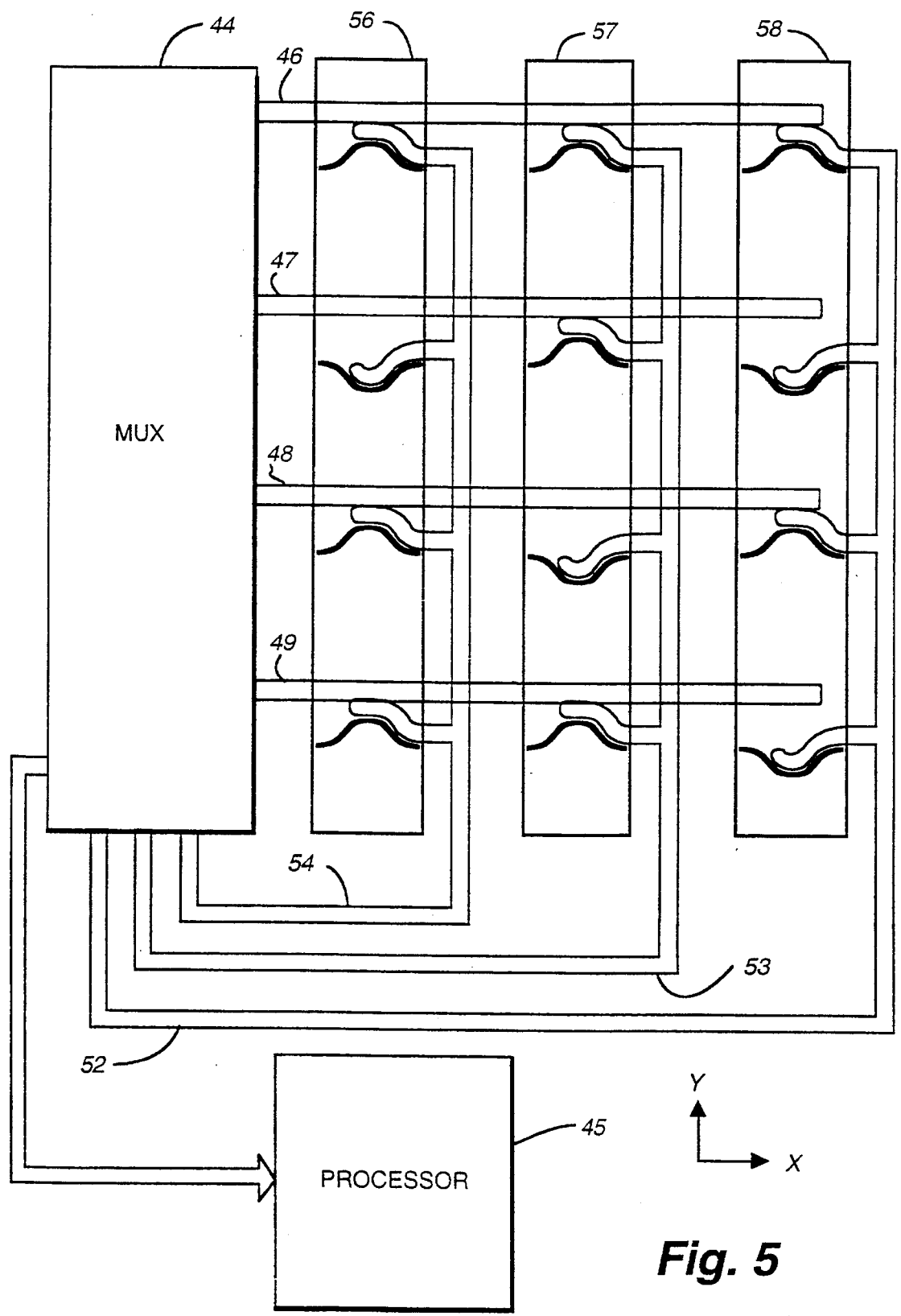
FIG. 5 shows a top view of a two dimensional array of twelve bistable switches of the type shown in FIG. 1 and associated circuitry and processor for use with non-conductive bistable switches.
Figure 6:
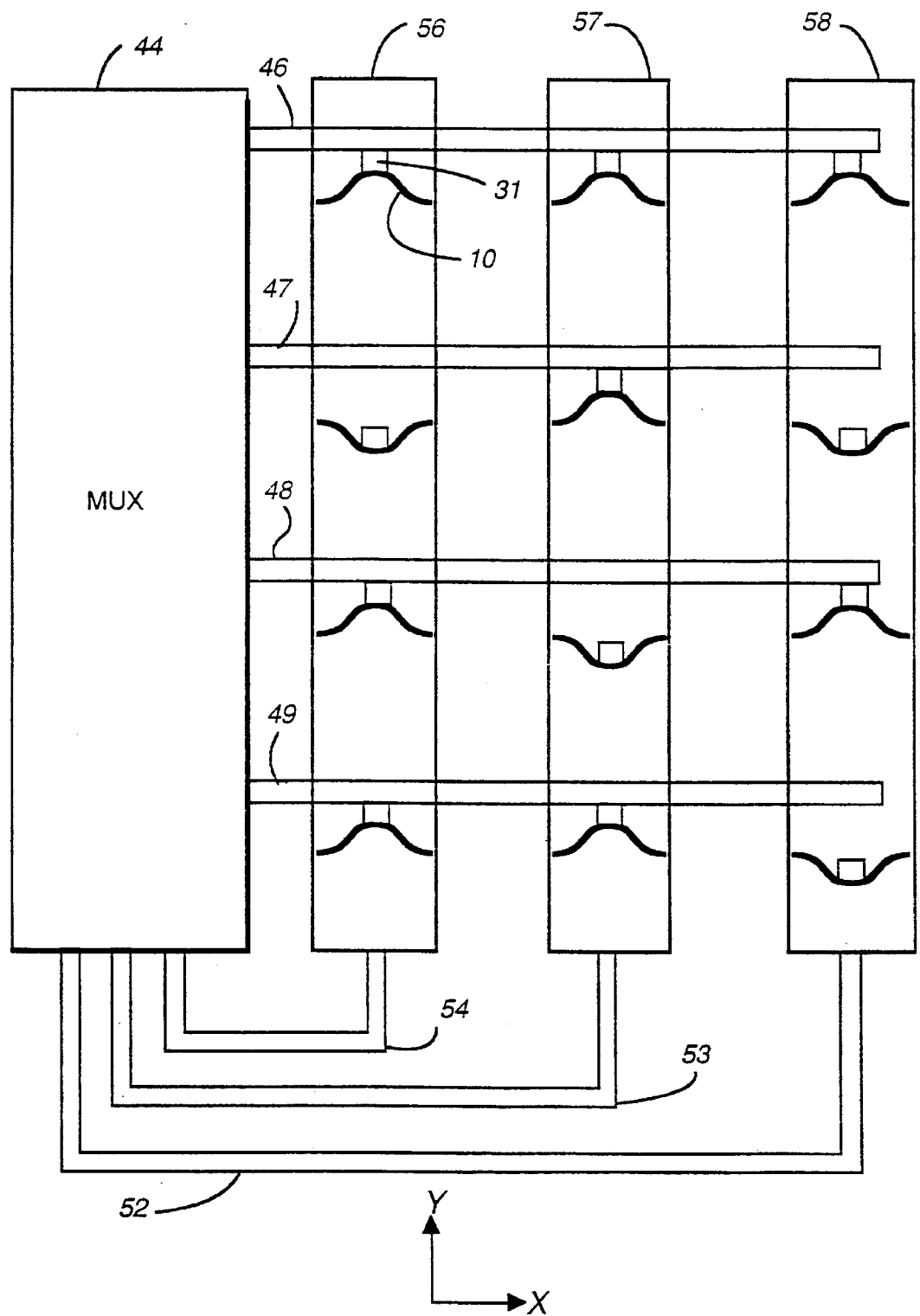
FIG. 6 shows a top view of a two dimensional array of twelve bistable switches of the type shown in FIG. 1 and associated circuitry, including a multiplexor means, for use with conductive bistable switches.

FIG. 5 shows a two dimensional array, or grid, of bistable switches formed of four rows 46, 47, 48, 49 and three columns 56, 57, an 58 of switches 10 (linked or unlinked) wired as shown in FIG. 4A and connected to specialized circuitry such as a multiplexor (MUX) 44 which cyclically samples each of the rows 46–49 in turn to determine which switches 10 of each row are in a given stable position. The particular configuration of FIG. 5 is useful for bistable dome switches formed of an electrically non-conductive material, such as non-conductive plastic. A slightly simpler configuration which could be used with electrically conductive material bistable dome switches is shown in FIG. 6. It would, of course, be possible to sample each switch independently, but the wiring and construction required would be more complex, as is known to those skilled in the art.

In FIG. 5, MUX 44 (as directed by external timing circuitry, not shown) samples one dimensional bistable switch columns 56, 57, and 58 in turn by, for example, applying a voltage to lines 52, 53, and 54 in turn. If line 54 is turned on, then voltages detected on lines 46–49 indicate which bistable switches 10 in column 56 are in the upward stable position. Similarly, if line 53 is turned on, the switches in column 57 are sampled, and if line 52 is turned on, column 58 is sampled. Thus, in FIG. 4, MUX 44 would read binary 1011 for column 56, 1101 for column 57, and 1010 for column 58, by applying voltage to lines 54, 53, and 52 in turn. It is worth noting that switch position data is provided to MUX 44 (and thus to its controlling processor 45) in digital format. Thus, no analog to digital conversion is necessary.

Note that the circuitry of FIG. 5 cannot directly measure horizontal flex in the x direction, since columns 56, 57, and 58 are physically separate. However, vertical flex in the y direction may be measured by each row, and horizontal flex may be estimated by comparing the outputs of the four rows. If greater accuracy is desired, a second row and column array may be placed perpendicular to the first array to directly measure horizontal flex.

For some applications, such as a simple bend sensor for rehabilitation of a human knee joint for example, processor 45 might only need to keep track of how many bistable dome switches are in a given position. Other, more sophisticated uses, might require processor 45 to keep track of precisely which switches are in which position at any given time.

FIG. 6 operates similarly to FIG. 5, and employs parallel reference numbering. Like FIG. 5, FIG. 6 shows a two dimensional four row, three column array, or grid, of bistable switches formed of rows 46–49 of switches 10 (linked or unlinked) wired as shown in FIG. 4A and connected to specialized circuitry such as a multiplexor (MUX) 44 which samples each of the four rows in turn to determine which switches 10 are in which stable position. The particular configuration of FIG. 6 is simpler than the configuration of FIG. 5, in that lines 52–54 are connected directly to the electrically conductive material forming the columns 56 through 58 respectively of switches. This configuration is useful for conductive bistable dome switches.

Lines 52 through 54 are each directly connected to one dimensional arrays (or columns) 56–58 because arrays 56–58 each comprise a single piece of conductive material, such as three pieces of metal. Thus, voltage applied to line 54, for example, effects all of the bistable switches in vertical column array 56. Bistable switches 10 may directly contact MUX row lines 46–49, or may make contact through pads 31 as shown in FIG. 6.

Figure 7A:
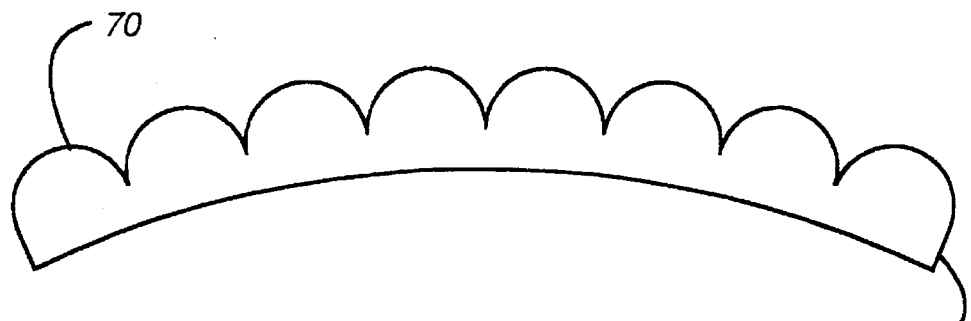
FIG. 7 shows an array of one-sided bistable switches in accordance with a third embodiment of the present invention.
Figure 7B:
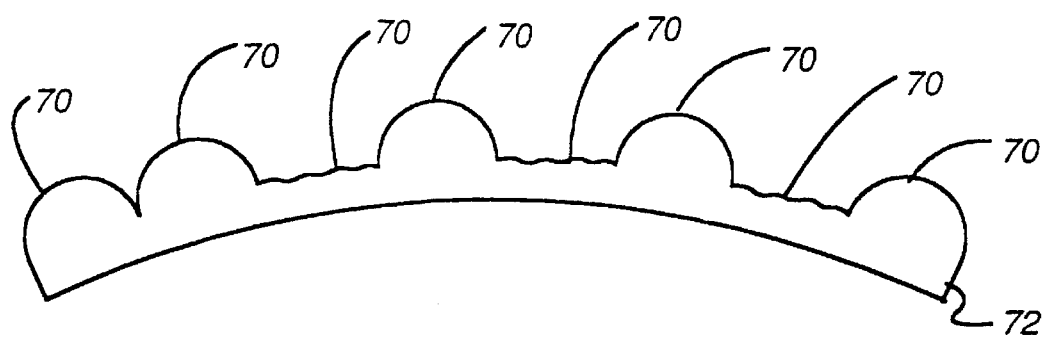
Figure 7C:
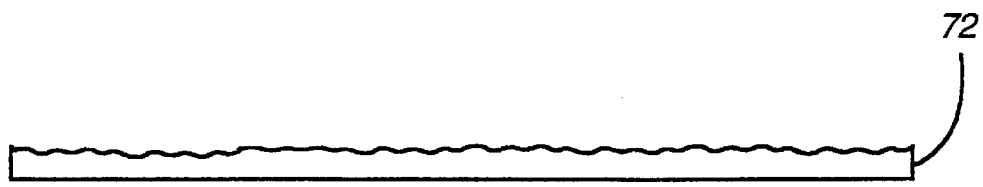

FIG. 7 is composed of FIGS. 7A, 7B, and 7C showing side section views of an array 72 of one-sided bistable switches 70 in three bending configurations. One-sided switches 70 are bistable, because they have two stable positions, i.e. an upper position and a lower position. However, one of the two stable positions is flat, while the other stable position protrudes (upward in FIG. 7).

FIG. 7A shows array 72 flexed upward far enough that all of the bistable dome shaped switches 70 are in the upward stable position. FIG. 7B shows array 72 as it is unflexed slightly. Three switches 70 have assumed the flat stable position (somewhat rippled as shown in FIG. 7B). A switch 70 which has assumed a flat position will maintain that flat position as long as array 72 maintains that arc (or a lesser arc). If array 72 is flattened out as in FIG. 7C, all eight of the switches 70 assume the flat position. One-sided switches 70 are manufactured by stamping spring steel or other material on only one side. The advantage of one-sided bistable switches 70 is that they are easier to manufacture and take up less room. One-sided switches 70 may be linked or unlinked (linked switches are shown in FIG. 7). Circuitry for one-sided switches 70 is similar to that shown in FIGS. 3–6, except that in general only the upper stable position would be detected, rather than both positions as in FIG. 3.

One sided bistable dome shaped switches 70 may also be manufactured to assume a protruding stable position when the array is flat, and switch to the flat stable position as the array is flexed such that the formerly protruding sides of switches 70 are on the inside of the curve.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for sensing the surface flexure of a flexible sheet of material having a surface, said apparatus comprising:

a switch array having a plurality of bistable dome shaped switches distributed across said material surface, each of said switches assuming one of two stable switch positions depending on the direction and degree of local surface flexure of the material;

position sensing means for sensing said switch position of said plurality of bistable dome shaped switches.

2. The apparatus of claim 1, wherein each of said bistable dome shaped switches form a closed perimeter and wherein adjacent switches have overlapping perimeters.

3. The apparatus of claim 1, wherein each of said bistable dome shaped switches form a closed perimeter and wherein adjacent switches have perimeters which do not overlap.

4. The apparatus of claim 1 wherein said two stable positions include a first position protruding to one side of said sheet, and a second non-protruding position.

5. The apparatus of claim 1 wherein said two stable positions include a first position protruding to one side of said sheet and a second position protruding to the other side of said sheet.

6. The apparatus of claim 1, wherein said position sensing means senses when each of said bistable dome shaped of said two stable positions.

7. The apparatus of claim 6 wherein said position sensing means senses when each of said bistable dome shaped switches is in the other of said two stable positions.

8. The apparatus of claim 6 wherein said sensing means further comprises:

electrical processing means responsive to the state of each said bistable dome shaped switches;

means for applying voltage to each of said bistable dome shaped switches;

wiring means for selectively making electrical contact to a bistable dome shaped switch in accordance with its switch state; and means connecting said wiring means to said processing means.

9. The apparatus of claim 8, further comprising:

said bistable dome shaped switches are organized into a plurality of one dimensional arrays;

said voltage applying means sequentially applying voltage across the switches in a given array at the same time, such that each array of switches has voltage applied thereto at different times; and said processor detecting which switches in a certain array are in a given position when said certain array has voltage applied across it.

10. The apparatus of claim 9 wherein the material of said arrays is electrically conductive, and said voltage applying means sequentially applies voltage to the material of each said array.

11. The apparatus of claim 9 wherein said voltage applying means applies voltage to each bistable dome shaped switch individually.

12. The apparatus of claim 11 wherein said voltage applying means further includes conductive pads attached to each switch.

13. The apparatus of claim 9, further including specialized circuitry for controlling the voltage applying means and for connecting switch position information from said wiring means to said processor.

14. The apparatus of claim 1 wherein said material is metal.

15. The apparatus of claim 14 wherein said material is spring steel.

16. The apparatus of claim 1 wherein said material is plastic.

17. The apparatus of claim 1 wherein said material is rubber.

* * * * *